United States Patent
Dudon et al.

(10) Patent No.: US 9,920,431 B2
(45) Date of Patent: Mar. 20, 2018

(54) PROCESS FOR PREPARING A SUBSTRATE FOR THERMAL SPRAYING OF A METAL COATING

(71) Applicant: SNECMA, Paris (FR)

(72) Inventors: Laurent Paul Dudon, Viry-Chatillon (FR); Antonio Cremildo Arantes, Saint Michel sur Orge (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/902,223

(22) PCT Filed: Jul. 3, 2014

(86) PCT No.: PCT/FR2014/051707
§ 371 (c)(1),
(2) Date: Dec. 30, 2015

(87) PCT Pub. No.: WO2015/001263
PCT Pub. Date: Jan. 8, 2015

(65) Prior Publication Data
US 2016/0369407 A1     Dec. 22, 2016

(30) Foreign Application Priority Data

Jul. 3, 2013   (FR) ..................... 13 56490

(51) Int. Cl.
*C23C 24/00* (2006.01)
*B05D 7/00* (2006.01)
(Continued)

(52) U.S. Cl.
CPC ............... *C23C 24/00* (2013.01); *B05D 3/12* (2013.01); *B05D 7/02* (2013.01); *B05D 7/24* (2013.01);
(Continued)

(58) Field of Classification Search
CPC ......... C23C 24/00; C23C 24/04; C23C 4/073; C23C 4/02; B05D 3/12; B05D 7/02; B05D 7/24; B05D 7/543
(Continued)

(56) References Cited

U.S. PATENT DOCUMENTS 3,230,284 A * 1/1966 Iverson .................. B05D 5/061
                                                                264/245
4,714,623 A   12/1987 Riccio et al.
(Continued)

FOREIGN PATENT DOCUMENTS

EP    0 275 083 A1    7/1988
FR    1 253 024 A     2/1961
(Continued)

OTHER PUBLICATIONS

Newport Glass, "Abrasive & Compounds", 2010, p. 1-3.*
(Continued)

*Primary Examiner* — Katherine A Bareford
*Assistant Examiner* — Christina D McClure
(74) *Attorney, Agent, or Firm* — Oblon, McClelland, Maier & Neustadt, L.L.P.

(57) ABSTRACT

A method of preparing a substrate to receive a metal coating deposited by thermal spraying, the method including the following steps: a) depositing a layer of adhesive on the zone to be coated, the layer having a uniform thickness greater than 10 μm and less than 100 μm; b) before the adhesive dries, cold spraying a metal powder onto the zone to be coated, so that powder particles become embedded at least in part in the layer of adhesive; and c) drying the adhesive in which the powder particles remain held captive, thereby forming an undercoat suitable for receiving a metal coating deposited by thermal spraying. The method is applicable to protecting the leading edges of fan blades.

17 Claims, 1 Drawing Sheet

Figure 1:
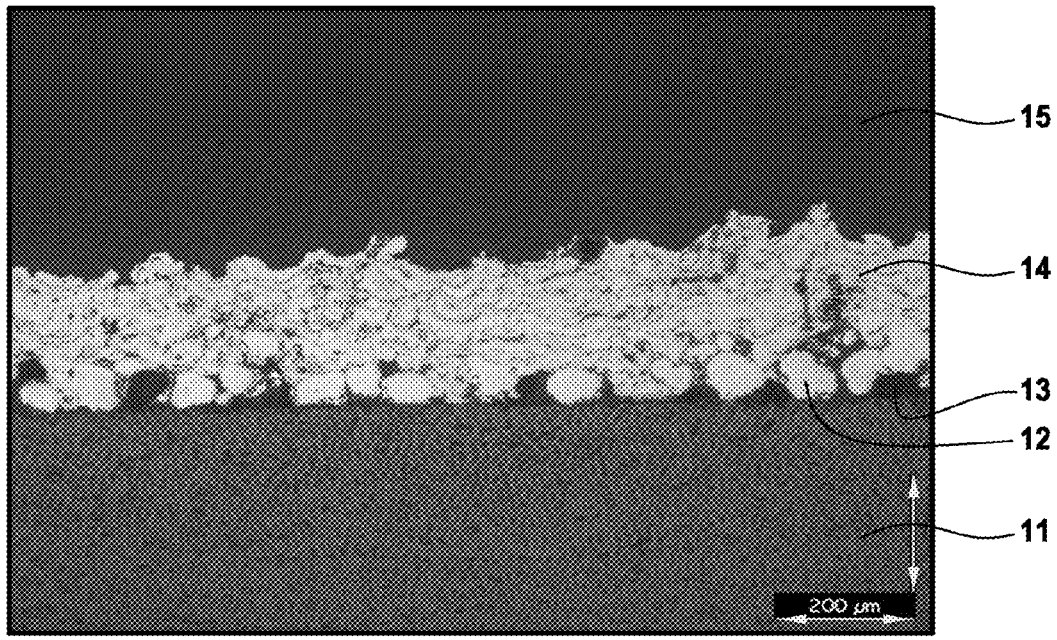

(51) Int. Cl.
 B05D 3/12 (2006.01)
 B05D 7/24 (2006.01)
 B05D 7/02 (2006.01)
 C23C 4/02 (2006.01)
 C23C 24/04 (2006.01)
 C23C 4/073 (2016.01)
(52) U.S. Cl.
 CPC ............... *B05D 7/542* (2013.01); *C23C 4/02* (2013.01); *C23C 4/073* (2016.01); *C23C 24/04* (2013.01)
(58) Field of Classification Search
 USPC .......................................................... 427/446
 See application file for complete search history.

(56) References Cited

U.S. PATENT DOCUMENTS

| | | | |
|---|---|---|---|
| 4,751,113 A | 6/1988 | Riccio et al. | |
| 4,883,703 A | 11/1989 | Riccio et al. | |
| 4,939,015 A | 7/1990 | Riccio et al. | |
| 4,971,838 A | 11/1990 | Hamamura et al. | |
| 2002/0102360 A1 | 8/2002 | Subramanian et al. | |
| 2005/0025896 A1 | 2/2005 | Grinberg et al. | |
| 2009/0004477 A1* | 1/2009 | Malle | B29C 70/12 428/412 |
| 2011/0103999 A1* | 5/2011 | Oguri | C23C 24/04 420/469 |
| 2011/0129351 A1* | 6/2011 | Das | C23C 24/04 416/241 A |
| 2011/0151202 A1* | 6/2011 | Feinstein | B32B 7/14 428/195.1 |

FOREIGN PATENT DOCUMENTS

| | | |
|---|---|---|
| WO | 87/04952 A1 | 8/1987 |
| WO | WO 2008/134369 A1 | 11/2008 |
| WO | 2013/042635 A1 | 3/2013 |

OTHER PUBLICATIONS

International Search Report dated Oct. 9, 2014 in PCT/FR14/51707 Filed Jul. 3, 2014.
Combined Office Action and Search Report dated Apr. 19, 2017 in Chinese Patent Application No. 201480037673.2 (English translation only).

* cited by examiner

PROCESS FOR PREPARING A SUBSTRATE FOR THERMAL SPRAYING OF A METAL COATING

The invention relates to a method of preparing a zone to be coated of a substrate to receive a metal coating deposited by thermal spraying.

More precisely, the invention relates to substrates that are particularly sensitive to high temperature, or more generally that present incompatibility with depositing a metal layer by thermal spraying.

In particular, and in non-limiting manner, the present invention relates to substrates made of organic matrix composite (OMC) material. Consideration may also be given specifically to substrates made of a magnesium-based alloy, or indeed to a substrate made completely or in part out of an organic material, such as plastics materials.

In the field of aviation, and more particularly in the field of airplane turbojet engines, reducing the weight of the component elements of the turbojet engine is a constant concern.

This concern has led to fan blades or stator guide vanes being developed that have airfoils made of an organic matrix composite material, since such composite airfoils are lighter in weight than metal airfoils. However, the leading edges such composite airfoils are too sensitive to erosion and to possible impacts (birds, gravel, ice, sand, etc.) to be used without protection.

It is therefore necessary to protect OMC parts in order to maintain their geometrical and physical integrity and in order to guarantee some minimum lifetime. It is known to protect such a leading edge by using:
  a metal reinforcing strip glued to the leading edge;
  an anti-erosion paint applied to the leading edge;
  a metal or plastics anti-erosion film glued to the leading edge; or
  a combination of the above-specified protections.

By way of example, the tip of the leading edge of an OMC blade, in particular a fan blade, may be provided with a metal coating.

This zone to be coated is itself like a thin foil, particularly when the blade is small, and it may be severely damaged by being coated by thermally spraying a metal.

Other applications are possible; in particular a casing such as the engine inlet casing situated around the fan, the low pressure guide vanes, and more generally any part that does not exceed a temperature of 150° C.

Document FR 2 978 931 discloses making a protective coating by thermal spraying in compression, in particular for countering the previously-described phenomenon of the coating being put under traction as a result of differential thermal expansion between the coating and the substrate.

Whatever the protection used, its ability to adhere to the leading edge is essential: it is necessary for the protection to adhere to the leading edge sufficiently well to accommodate impacts without becoming detached and without moving relative to the edge, and in order to satisfy lifetime requirements while in normal operation.

Coatings obtained by thermal spraying constitute a technique that satisfies this need. Nevertheless, on OMC parts that are of complex shape, thermal spraying presents several difficulties:
  Adhesion of the coating: OMC parts are mainly formed of fibers (>70%), in particular carbon fibers, and of a smaller content of resin (<30%), in particular epoxy resin. Conversely, because of its structure and the way it is fabricated, the surface of OMC material is made up more of resin than of carbon fiber, and although thermally sprayed coatings adhere to carbon fiber, they adhere very poorly to resin. As a result, the coating adheres to an OMC material only via the carbon fiber material present at its surface, i.e. at best via 50% of the surface area.
  The high temperature effect of thermal spraying onto an OMC: during thermal spraying, epoxy resin deteriorates under the effect of the heat generated by the sprayed molten metal; this is also true of carbon fiber, but to a lesser extent. This defect arises from the low thermal diffusivity of resin and of carbon.

For thermal spraying, thermal diffusivity is seen as the capacity of a substrate to be coated to evacuate or disperse more or less quickly the heat that it receives, specifically from the molten powder. The lower its thermal diffusivity, the greater the extent to which heat becomes concentrated locally in the impacted substrate; with this being to the detriment of its own integrity. This thermal effect damages the surfaces of OMC substrates to a depth of several tenths of a millimeter (mm). For parts that are of small thickness (<2 mm), or of light weight, this effect is amplified and destructive.

Differential thermal expansion: thermal spraying consists in depositing a coating on the surface of a part by spraying a molten powder. On cooling, the coating is subject to contraction as a result of thermal contraction that is greater than the contraction of the colder substrate. This difference in thermal contraction/expansion between the coating and the substrate leads to tension in the coating which is then said to be "in traction". This phenomenon degrades adhesion of the coating on the substrate and it increases with increasing difference between the thermal expansion characteristics of the coating and of the substrate. This applies in particular with an OMC substrate, which has a coefficient of thermal expansion that is small, compared with that of the metal coating, which has a medium coefficient of thermal expansion.

An object of the present invention is to provide a method making it possible to overcome the drawbacks of the prior art, and in particular making it possible to deposit a metal coating on a substrate, in particular an OMC substrate, by thermal spraying, and to do so with improved adhesion and strength.

To this end, in the present invention, the method is characterized in that the following steps are performed:
  a) depositing a layer of adhesive on the zone to be coated, the layer having a uniform thickness greater than 10 micrometers (μm) and less than 100 μm;
  b) before the adhesive dries, cold spraying a metal powder onto the zone to be coated, so that powder particles become embedded at least in part in said layer of adhesive; and
  c) drying the adhesive in which said powder particles remain held captive, thereby forming an undercoat suitable for receiving a metal coating deposited by thermal spraying.

In this way, it may be understood that because of the presence of the adhesive, it is possible to cold deposit metal powder particles, i.e. at ambient temperature, onto the surface of the substrate and to do so without damaging the substrate in any way in a zone that is restricted to the zone to be coated, which metal powder particles serve to protect the substrate during subsequent thermal spraying for the purpose of depositing the metal coating.

Thus, with an OMC substrate, metal powder particles are cold deposited onto the surface of the OMC substrate without damaging in any way the fibers or the matrix of the substrate in a zone that is limited to the zone to be coated, which metal powder particles then serve to protect the OMC substrate during subsequent thermal spraying for depositing the metal coating itself.

The undercoat is made up of metal powder particles glued onto the substrate instead of being melted and sprayed onto the substrate.

Overall, by using the solution of the present invention, it is possible to make a cold metal adhesion undercoat.

This technique may thus be applied to any substrate onto which the adhesive adheres.

The adhesive is preferably suitable for drying (or curing) at a temperature of less than 100° C., so as to avoid damaging the substrate, in particular an OMC substrate, during the drying step.

This solution further presents the additional advantage of also making it possible, by an appropriate selection of the composition of the powder used for the undercoat, to make a metal coating out of materials selected from the entire possible range of materials that are suitable for use in providing protection against wear and friction.

In non-limiting manner, these materials may include the following metal powders: NiAl, NiCrAl, NiCrAlY, CuNiIn, CuAl, Co-based alloys of the "Triballoy" (registered trademark) or "Stellite" (registered trademark) type, carbide cermets of WC-metal or $Cr_2C_3$-metal type, possibly incorporating lubricating varnishes (of the metal-boron nitride or metal-graphite type) in a single powder or indeed in a mixture of two or more powders.

The subsequent adhesion of the coating obtained by thermal spraying onto the glued-on undercoat depends on various parameters among which the thickness of the layer of adhesive. If the layer of adhesive is too thick, then the metal powder particles are covered in adhesive and adhesion is reduced, since during thermal spraying the molten material initially does not encounter the metal particles of the undercoat.

The undercoat is made up of non-molten metal powder particles, which for the great majority are:

half embedded in the adhesive on the substrate side; and
half projecting from the layer of adhesive on the other side; this undercoat is thus ready to receive the thermally projected layer.

For this purpose, it may be understood that the layer of adhesive needs to present thickness that is smaller than the size of the powder particles. Thus, preferably, said layer of adhesive presents a thickness smaller than the mean diameter $d_{50}$ of the particles of said powder.

If the surface concentration of the particles of metal powder (or of the mixture of powders) is low, then adhesion is reduced correspondingly.

Surface concentration is the number of particles per unit area. If the metal particles are widely spaced apart, then surface concentration is low. If the metal particles are side by side, then surface concentration is maximized. The adhesion of the subsequently sprayed-on coating depends on this surface concentration. Strong adhesion requires surface concentration to be fairly high, but not at its maximum, so as to leave sufficient adhesive to ensure adhesion of the undercoat that is glued onto the substrate.

This parameter is adjusted by the grain size distribution of the metal powder relative to the fluidity of the adhesive used.

In a preferred embodiment, at the end of step b), more than 70% and less than 95% of the surface area of the zone to be coated is covered in powder particles.

In a preferred embodiment, after depositing the adhesive in step a), the substrate with the adhesive applied thereto is placed in a mixer or a stirrer that is set into motion to counter the adhesive creeping over the zone to be coated, said movement being continued during cold spraying step b) and adhesive drying step c) and being stopped once the adhesive has cured.

By way of example, such a mixer is a three-dimensional dynamic mixer of the "Turbula" (registered trademark) type.

This avoids the adhesive creeping or running and maintains a regular thickness for the adhesive corresponding to the thickness of the adhesive while it is being deposited.

In preferred manner, before step a), a step a0) is performed consisting in making the roughness of the surface of the substrate uniform in the zone to be coated, in particular by sandblasting, and more specifically sandblasting with fine sand.

By means of such a step, it is made easier to obtain more regular application of adhesive in step a).

In another preferred embodiment, at the end of step c), a step c') is performed during which the undercoat is subjected to finishing by removing non-glued powder particles. By way of example, this removal may be performed by blowing and/or sandblasting.

This step serves to minimize or completely to eliminate the presence of non-glued powder particles, in particular particles caught on the surface of the layer of adhesive, which might otherwise lead to extra thicknesses in the undercoat and might also give rise to local problems of adhesion for the metal coating deposited on the undercoat by thermal spraying.

The invention also provides a method of protecting a substrate against wear, in which the above-described preparation method is performed and further including, after step c), a step d) during which a metal coating is deposited on the undercoat by thermal spraying, thereby forming a metal protective layer on the substrate.

This metal protective layer is for depositing either directly onto the undercoat, or else onto an intermediate layer that covers the undercoat.

By way of example, the intermediate layer may correspond to a second metal undercoat.

The invention also provides a part made from a substrate including a coating against wear that includes:

an undercoat glued onto the substrate and presenting powder particles of a metal material that are embedded at least in part in a resin matrix presenting a thickness greater than 10 μm, less than 100 μm, and less than the mean diameter $d_{50}$ of the particles of said powder; and
a wear protection layer, of thickness greater than 100 μm, which layer is continuous and made of a metal material.

It is found that the resin matrix of the undercoat on such a part presents a thickness of the same order of magnitude as the size of the powder particles in the undercoat, i.e. a thickness that is close to the size of the powder particles, which may be estimated as being a thickness lying in the range 30% to 120%, preferably in the range 30% to 95%, and still more advantageously in the range 40% to 80% of the mean diameter $d_{50}$ of the particles of said powder.

In preferred manner, the invention provides a part in which the substrate is made of an organic matrix composite material.

Such a part may in particular be an airfoil made of organic matrix composite material and having a leading edge, the leading edge being protected by reinforcement formed by a metal coating deposited on the leading edge using the above-defined protection method.

Such an airfoil is an airfoil of a turbine engine blade, of a helicopter blade, or of a propeller blade.

Ideally, the thickness of the adhesive should be close to half the mean diameter $d_{50}$ of the particles of the powder subsequently sprayed on cold.

Preferably, the layer of adhesive presents a thickness greater than 10 µm and less than 50 µm, this thickness of the layer of adhesive preferably lying in the range 20 µm to 40 µm.

For powder presenting grain size defined by $d_{10}$=45 µm and $d_{90}$=90 µm, this thickness for the adhesive is advantageously about 30 µm.

The adhesive is deposited using a brush, a pad, a spray gun, or by any other means enabling a layer to be obtained that is as regular as possible in thickness.

Advantageously, said layer of adhesive is formed by an epoxy adhesive including a resin and a curing agent mixed together prior to step a) before the adhesive deposition step a).

Subsequently, before the adhesive has dried, metal powder as commonly used for thermal spray undercoat, namely: NiAl, NiCrAl, NiCrAlY, . . . , is sprayed onto the adhesive-covered surface.

The particles of the powder then form a regular metal layer on the part/substrate, with this applying regardless of the potentially complex shape of the part since the powder is sprayed.

Among techniques suitable for cold spraying the powder of the undercoat, mention may be made in non-limiting manner of manual deposition, using a spray gun, a pad, an air brush, . . . .

It may thus be understood that this technique is not limited as to the shape of the zones to be coated, except possibly by the lack of accessibility to the zone to be coated whether by the system for cold spraying the powder forming the undercoat or by the system for thermal spraying the powder forming the final thermal protection coating.

The part having metal powder glued thereon is dried in compliance with the specifications for the adhesive. For OMC parts, an adhesive should be selected that does not require a temperature of more than 100° C. for drying.

After drying, the OMC part is coated in a rough metal undercoat identical to a part that has had a standard undercoat deposited thereon by thermal spraying.

Under such circumstances, any conventional thermally sprayed coating may be deposited on this undercoat.

During this latter operation, the part being sprayed needs to be cooled using conventional techniques in order to avoid exceeding the temperatures at which the OMC and the adhesive degrade, and preferably to keep at a temperature below 110° C., and/or in order to avoid as much as possible introducing any traction stresses that might lead to delamination of the coating.

Such cooling techniques include setting up cooling that is localized close to the zone being thermally sprayed by using one or the other of the following techniques: continuously blowing cold air or droplets of liquid carbon dioxide or liquid nitrogen. These cooling techniques may be combined with thermal spraying at a low rate in order to minimize the amount of heat that is delivered to the OMC by the molten powder particles.

It may be understood that the range of metal coatings that may be deposited on the glued undercoat is associated with the high-temperature behavior of the adhesive, and it may also be understood that techniques for cooling the part when used in combination with performing thermal spraying at a "cold" rate (rapid scanning speed, low powder delivery rate, and making use of pauses in the spraying to avoid overheating) make it possible to deposit any type of coating.

Furthermore, the adhesion of the coating layer deposited by thermal spraying onto the undercoat is improved by using a powder in the undercoat that presents particles of shape that is irregular rather than close to being spherical. Furthermore, such irregular shapes bind better to the layer of adhesive.

It is preferable to select powders having a particle sphericity factor that is less than 0.75, advantageously less than 0.70, and still more advantageously less than 0.65, with an even more advantageous situation when this sphericity factor is less than 0.60.

The term "sphericity", is used to mean the sphericity factor (a dimensionless number) as defined by Wadell as follows: the ratio between the surface area of a sphere having the same volume as the particle and the surface area of the particle in question ($\Psi_v$), which is also equivalent to the square of the ratio between the volume equivalent diameter and the area equivalent diameter. A value of 1 corresponds to a perfect sphere.

Advantageously, all of the particles of the powder used in the invention present a form factor lying in the range 1.5 to 3. Preferably, this form factor lies in the range 1.6 to 2.5, advantageously in the range 1.7 to 2.3, and more advantageously in the range 1.8 to 2.

This form factor, which gives a good indication of the slenderness ratio of the particles, is defined as the ratio between the maximum Feret diameter (maximum distance between two tangents parallel to two opposite sides of the particle) to the minimum Feret diameter (minimum distance between two tangents parallel to opposite sides of the particle). Thus, a form factor of 1 corresponds to a sphere and a form factor of $\sqrt{2}$ corresponds to a cube.

In the present text, the term "particle" corresponds to a physical entity that is isolated from the other physical entities of the powder in question.

Among the various types of powder in existence, in particular, in the context of the present invention, water atomized powders are preferred to gas atomized powders. Specifically, water atomized powders are made up of particles that are very irregular in shape, being rather slender and remote from the shape of a sphere. Such water atomized powders are thus better for the adhesive bonding of the invention.

The part is now ready to be coated by standard thermal spraying, in particular by any of the following spraying techniques: by blow torch, by wire arc, by high velocity oxifuel (HVOF) spraying, or by plasma arc torch (atmospheric plasma spraying (APS), inert gas plasma spraying (IPS), or low pressure plasma spraying (LPPS)), or by cold spraying, which consists in spraying at very high speed a powder that is heated solely by hot air or by a hot gas.

Since the surface is made of metal and is rough, any kind of coating is possible. For an anti-erosion application it is appropriate to select a WC-metal coating (tungsten carbide with a cobalt binder). High-pressure-HVOF spraying may be used for example to deposit the WC-metal coating in compression.

The thickness of the coating typically lies in the range 0.5 mm to 20 mm.

In an advantageous provision, the metal coating that is deposited by thermal spraying is made of the same material as the metal powder that is cold sprayed in order to form the undercoat.

Figure 2:
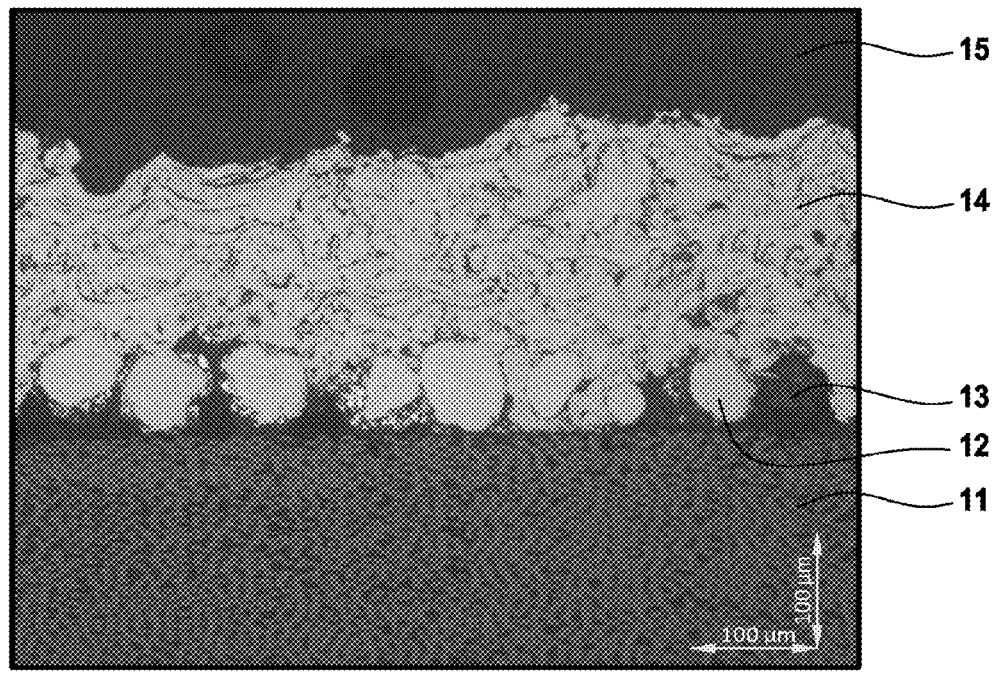

Other advantages and characteristics of the invention appear on reading the following description made by way of example and with reference to the accompanying drawing, in which FIGS. 1 and 2 are micrographs of a coating sprayed onto an OMC substrate and obtained by the method of the invention.

By way of example, there follows a description of applying the method of the invention to making a coating on the leading edge of a fan blade made by resin transfer molding (RTM).

The RTM fan blade has a leading edge that is fine and of complex shape along its length. The thickness of the leading edge does not exceed 2 mm. Since it is made of a composite material (three-dimensionally woven carbon fibers and an injected epoxy resin), the leading edge of the blade is sensitive to erosion. It is essential to protect the leading edge using anti-erosion reinforcement. At present, such reinforcement consists in a shaped metal part glued on the leading edge. On the pressure and suction sides of the blade, it extends away from the leading edge over about 40 mm. Although this reinforcement made of Ti alloy is relatively thin in its portions overlying the pressure and suction sides of the blade, it is thick (in the range 5 mm to 10 mm) at its vertex, since Ti alloy is itself somewhat sensitive to erosion and a reserve of thickness is necessary.

The method of the invention is applied using the following steps:

Degreasing: the part is degreased.

Masking prior to applying adhesive: masking is performed using a polyvinyl chloride (PVC) adhesive tape that is also used as adhesive for providing protection against sandblasting. It protects the zones that are not to receive adhesive and that are not to be coated.

Sandblasting: the zones that are to receive adhesive are subjected to sandblasting using corundum (grain size 180 µm or 300 µm). This preparation by sandblasting serves to obtain a surface that is of uniform roughness, so that the adhesive spreads regularly over the surface (it is desired to obtain roughness Ra lying in the range 0.8 µm to 5 µm).

Depositing the adhesive: for this purpose, use is made of the "Specifix de Struers" epoxy resin-adhesive. The resin-adhesive is prepared by mixing the "Specifix Resin" resin with its curing agent "Specifix-40 curing agent".

A brush is used to spread the preparation as a thin layer over the zone of the blade that is to receive adhesive (the zone to be coated). A fluorescent dye may be included in the resin so as to make the regularity of its thickness show up by color contrast when using an ultraviolet (UV) lamp. Ideally, the resin may be deposited using a spray gun carried by a robot so as to obtain better reproducibility. The thickness of the deposited resin-adhesive is about 30 µm. If the thickness is sufficiently thin, the resin-adhesive should not creep. Finally, the powder is deposited manually or using a spray gun over the adhesive-coated zone.

In order to avoid the effects of the resin-adhesive running and/or creeping under gravity, the blade is secured to a machine that moves it in such a manner as to counter those effects, i.e. a machine of the mixer or stirrer type. In this example, the machine is a three-dimensional dynamic mixer such as a "Turbula" (registered trademark) type machine that is used for a purpose other than its primary function. The three-dimensional movement generated by the machine and the speed of that movement are such that they prevent the resin-adhesive from creeping.

The powder is then sprayed while the part is moving in the machine by using a spray gun, itself carried by a robot. Specifically, this is the spray gun of a thermal spray robot, but its heat source is deactivated.

Polymerizing or curing the resin-adhesive: the resin-adhesive that has been selected cures in 1 hour (h) at a temperature of 90° C., or in 3 h at a temperature of 50° C.

Ideally, the blade continues to be moved in the same machine at least for the time necessary to ensure that the resin has polymerized sufficiently to creep no longer.

Finishing by blowing or sandblasting: the glued-on metal undercoat is cleared of non-glued excess powder by blowing or by sandblasting with fine corundum (50 µm).

Mask removal and visual inspection: the mask is removed from the part and its appearance is inspected visually. Its appearance must show a deposit that is regular in thickness, without any variation in color and without any local gaps in the glued-on undercoat.

Coatings made using this technique have been tested for adhesive strength by using the ASTM standard C333 known as the "pull-off" test.

Tests have been performed using metal studs with an adhesive undercoat of previously applied NiAl (Ni185 from the supplier Praxair) powder and an NiAl metal coating layer having the same composition deposited by the blown arc plasma torch method. The measured values of adhesion were about 20 megapascals (MPa).

With reference to FIGS. 1 and 2, the following layers may be seen:

- an OMC substrate 11 made of carbon fibers (visible in section, of pale color) coated in epoxy resin (darker color);
- an undercoat placed immediately on the substrate 11: this undercoat of applied adhesive is constituted by a single layer 12 of NiAl powder particles embedded to half depth in the resin-adhesive 13. On the right (FIG. 1 and FIG. 2, at the location of the arrow marking the resin-adhesive 13), a particle of powder has been torn off during polishing;
- the NiAl coating layer 14 sprayed by blown arc plasma torch onto the undercoat and having a thickness of 0.2 mm; and
- a layer 15 of coating resin covering the coating 14 for subsequent polishing of the coating layer 14.

More precisely, in FIG. 1, the adhesive undercoat is adjusted to have the thickness of one layer of powder particles. This adjustment is associated with the thickness of the previously applied resin-adhesive. Particles of NiAl (type Ni185, trademark Praxair) were torn off during polishing.

The invention claimed is:

1. A preparation method for preparing a zone of a substrate to be coated, the method comprising:
   a) depositing a layer of adhesive on the zone of the substrate to be coated, the layer having a uniform thickness greater than 10 µm and less than 100 µm;
   b) after depositing the layer of adhesive but before the adhesive cures, cold spraying metal powder particles onto the layer of adhesive on the zone of the substrate to be coated, so that the metal powder particles become partially embedded in said layer of adhesive; and
   c) curing the layer of adhesive in which said powder particles are partially embedded, thereby forming an undercoat;
   wherein the substrate with the layer of adhesive deposited thereon is subjected to motion to counter adhesive creeping over the zone of the substrate to be coated, said motion being continued during b) and c), and wherein at the end of b), more than 70% and less than 95% of a surface area of the zone of the substrate to be coated is covered in the metal powder particles.

2. A method according to claim 1, wherein the layer of adhesive has a thickness greater than 10 μm and less than 50 μm.

3. A method according to claim 1, wherein said layer of adhesive has a thickness less than a mean diameter $d_{50}$ of the metal powder particles.

4. A method according to claim 1, wherein said layer of adhesive is formed by an epoxy adhesive comprising a resin and a curing agent.

5. A method according to claim 1, wherein prior to a), a roughness of the surface of the substrate in the zone to be coated is made uniform.

6. A method according to claim 1, further comprising subjecting the undercoat to finishing by removing non-glued metal powder particles.

7. A method according to claim 1, further comprising depositing a metal coating on the undercoat by thermal spraying, thereby forming a metal protective layer on the zone of substrate to be coated.

8. A method according to claim 1, wherein the substrate is made of an organic matrix composite.

9. A method according to claim 8, wherein the organic matrix composite comprises carbon fibers and resin.

10. A method according to claim 9, wherein the substrate is an airfoil and the zone of the substrate to be coated is a leading edge of the airfoil.

11. A method according to claim 10, wherein:
said layer of adhesive has a thickness that is 30%-95% of a mean diameter $d_{50}$ of the metal powder particles;
at the end of b), more than 70% and less than 95% of a surface area of the leading edge of the airfoil is covered in the metal powder particles; and
the metal powder particles have a particle sphericity factor that is less than 0.75, and a form factor of 1.5 to 3.

12. A method according to claim 11, wherein:
said layer of adhesive has a thickness that is 40%-80% of a mean diameter $d_{50}$ of the metal powder particles; and
the metal powder particles have a particle sphericity factor that is less than 0.60, and a form factor of 1.8 to 2.

13. A method according to claim 12, further comprising depositing a metal coating on the undercoat by thermal spraying, thereby forming a metal protective layer on the zone of substrate to be coated.

14. A method according to claim 11, further comprising depositing a metal coating on the undercoat by thermal spraying, thereby forming a metal protective layer on the zone of substrate to be coated.

15. A method according to claim 8, further comprising depositing a metal coating on the undercoat by thermal spraying, thereby forming a metal protective layer on the zone of substrate to be coated.

16. A method according to claim 1, wherein the zone of the substrate to be coated is a leading edge of an airfoil.

17. A method according to claim 1, wherein:
said layer of adhesive has a thickness that is 30%-95% of a mean diameter $d_{50}$ of the metal powder particles;
at the end of b), more than 70% and less than 95% of a surface area of the zone of the substrate to be coated is covered in the metal powder particles; and
the metal powder particles have a particle sphericity factor that is less than 0.75, and a form factor of 1.5 to 3.

* * * * *